(12) United States Patent
Aoki et al.

(10) Patent No.: US 9,915,284 B2
(45) Date of Patent: Mar. 13, 2018

(54) TERMINAL SUPPORTING APPARATUS FOR CONTROL CABLE

(71) Applicant: Chuo Hatsujo Kabushiki Kaisha, Nagoya (JP)

(72) Inventors: Masahiko Aoki, Nagoya (JP); Kazuyoshi Nono, Nagoya (JP); Takashi Goto, Nagoya (JP); Yuichi Hirata, Nagoya (JP)

(73) Assignee: CHUO HATSUJO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 15/465,308

(22) Filed: Mar. 21, 2017

(65) Prior Publication Data

US 2017/0198745 A1 Jul. 13, 2017

Related U.S. Application Data

(62) Division of application No. 14/352,116, filed as application No. PCT/JP2012/077236 on Oct. 22, 2012, now Pat. No. 9,638,238.

(30) Foreign Application Priority Data

Oct. 21, 2011 (JP) ................................ 2011-231229

(51) Int. Cl.
 *F16C 1/14* (2006.01)
 *F16C 1/10* (2006.01)
 *F16H 59/10* (2006.01)

(52) U.S. Cl.
 CPC .............. *F16C 1/145* (2013.01); *F16C 1/103* (2013.01); *F16C 1/108* (2013.01); *F16H 59/10* (2013.01)

(58) Field of Classification Search
 CPC .......... F16C 1/103; F16C 1/105; F16C 1/108; F16C 1/145; F16C 1/262; F16C 1/226; Y10T 74/2045
 See application file for complete search history.

(56) References Cited

U.S. PATENT DOCUMENTS 7,597,027 B2 10/2009 Kwon
2014/0116189 A1 5/2014 Nono

FOREIGN PATENT DOCUMENTS

JP S63-66332 5/1988
JP H3-020721 2/1991
(Continued)

OTHER PUBLICATIONS

PCT International Search Report dated Dec. 4, 2012, PCT Patent Application No. PCT/JP2012/077236.
(Continued)

*Primary Examiner* — Thomas C Diaz
(74) *Attorney, Agent, or Firm* — Vierra Magen Marcus LLP

(57) ABSTRACT

A terminal supporting apparatus is provided with: a hub that is attached to an end of the outer cable and is provided with a flange on an outer periphery; a cushion member that is provided to surround the outer periphery of the hub and abuts on the flange at both a front surface and a back surface of the flange; and a housing that houses the cushion member. The cushion member includes a large-diameter portion that abuts on the flange. At least within a range contacting with the hub, at least a part of an outer peripheral surface of the large-diameter portion is fixed to an inner surface of the housing, while a clearance is formed between the cushion member and the inner surface of the housing over an entire region of an end surface of the large-diameter portion in a cable axis direction.

4 Claims, 6 Drawing Sheets

(56) References Cited

FOREIGN PATENT DOCUMENTS

| JP | H3-030654 | 3/1991 | | |
|---|---|---|---|---|
| JP | 2008-019977 | 1/2008 | | |
| JP | 2008019977 A | * 1/2008 | ............. | F16C 1/108 |
| JP | 2009-197865 | 9/2009 | | |
| JP | 4618395 B2 | 1/2011 | | |

OTHER PUBLICATIONS

PCT Written Opinion of the International Searching Authority dated Dec. 4, 2012, PCT Patent Application No. PCT/JP2012/077236.
English Translation of Abstract of Japanese Patent Application No. JP2008-019977.
Machine Translation prepared by the Japanese Patent Office of Japanese Patent Application No. JP2008-019977.
English Translation of Abstract of Japanese Patent Application No. JP2009-197865.
Machine Translation prepared by the Japanese Patent Office of Japanese Patent Application No. JP2009-197865.
Restriction dated Nov. 9, 2015, in U.S. Appl. No. 14/352,116, filed Apr. 16, 2014.
Amendment dated Jan. 11, 2016, in U.S. Appl. No. 14/352,116, filed Apr. 16, 2014.
Office Action dated Jan. 29, 2016, in U.S. Appl. No. 14/352,116, filed Apr. 16, 2014.
Amendment dated Jul. 19, 2016, in U.S. Appl. No. 14/352,116, filed Apr. 16, 2014.
Office Action dated Aug. 17, 2016, in U.S. Appl. No. 14/352,116, filed Apr. 16, 2014.
Amendment dated Oct. 17, 2016, in U.S. Appl. No. 14/352,116, filed Apr. 16, 2014.
Advisory Action dated Oct. 27, 2016, in U.S. Appl. No. 14/352,116, filed Apr. 16, 2014.
Notice of Allowance dated Dec. 23, 2016, in U.S. Appl. No. 14/352,116, filed Apr. 16, 2014.

* cited by examiner

TERMINAL SUPPORTING APPARATUS FOR CONTROL CABLE

CLAIM OF PRIORITY

This application is a divisional of U.S. patent application Ser. No. 14/352,116, which is a 371 of PCT/JP2012/077236 filed Oct. 22, 2012, and claims priority to JP 2011-231229 filed Oct. 21, 2011, which are all incorporated herein by reference.

TECHNICAL FIELD

The technique disclosed in the present specification relates to an apparatus (hereinafter, referred as a terminal supporting apparatus) that supports an end of a control cable (e.g. control cable arranged between a shift lever and a transmission in a car, or the like).

BACKGROUND ART

Generally, a control cable includes an outer cable with a cylindrical shape and an inner cable inserted into the outer cable. One end of the outer cable is attached to a housing of an input device or the like, and the other end of the outer cable is attached to a housing of an output device or the like. The outer cable guides the inner cable from the input device to the output device. The operator's operation (e.g. a pushing/pulling operation or the like) input into the input device is input into one end of the inner cable. The operation input into the one end of the inner cable is transmitted from the other end of the inner cable to the output device.

When the input device and the output device are connected by the control cable as described above, vibration of the output device may be transmitted to the input device via the control cable, or vibration of the input device may be transmitted to the output device via the control cable. In order to prevent the transmission of the vibration between the input device and the output device via the control cable, a technique has been developed in which an end of the outer cable is attached to the housing via a cushion member (e.g. Japanese Patent Application Publication No. 2008-019977). In this technique, the transmission of the vibration is inhibited by providing the cushion member between the end of the outer cable and the housing.

SUMMARY OF INVENTION

Technical Problem

When a control cable is utilized for connecting an input device and an output device, it is required to position an end of the outer cable in a cable axis direction with respect to the input device and the output device. That is because, if the position of the end of the outer cable is significantly deviated, an operation input into the inner cable may not be transmitted to the output side or the like. Thus, even when a cushion member is provided between the end of the outer cable and a housing, it is required to position the end of the outer cable in the cable axis direction. Therefore, in the prior art, the cushion member is compressed in the cable axis direction in order to contact the end surface of the compressed cushion member with the housing, to position the end of the outer cable in the cable axis direction.

On the other hand, for inhibiting the transmission of the vibration between the input apparatus and the output apparatus, it is preferred to lower rigidity of the cushion member in the axial direction. However, as described above, in the prior art, the cushion member is compressed in the cable axis direction and the end surface is contacting with the housing. Thus, the rigidity of the cushion member in the cable axis direction tends to be higher. Therefore, it is difficult to lower the rigidity in the cable axis direction.

The present specification has an object to provide a terminal supporting apparatus that can position an end of an outer cable in a cable axis direction and also can lower rigidity of a cushion member in the axial direction.

Solution to Problem

A terminal supporting apparatus disclosed in the present specification supports at least either one of ends of a control cable that has an inner cable and an outer cable into which the inner cable is inserted. This terminal supporting apparatus includes a hub that is attached to an end of the outer cable and is provided with a flange on its outer periphery, a cushion member that is provided to surround the outer periphery of the hub and abuts on the flange at both a front surface and a back surface of the flange, and a housing that houses the cushion member. The cushion member includes a large-diameter portion that abuts on the flange. At least within a range contacting with the hub, at least a part of an outer peripheral surface of the large-diameter portion is fixed to an inner surface of the housing, while a clearance is formed between the cushion member and the inner surface of the housing over an entire region of an end surface of the large-diameter portion in a cable axis direction.

In this terminal support apparatus, at least a part of the outer peripheral surface of the large-diameter portion of the cushion member is fixed to the inner surface of the housing. Thus, the cushion member is positioned in the cable axis direction, and the end of the outer cable is also positioned in the cable axis direction. On the other hand, an end surface of the large-diameter portion of the cushion member does not abut on the inner surface of the housing. Thus, a clearance is formed between them. Hence, even if a force in the cable axis direction acts on the cushion member, the cushion member and the inner surface of the housing do not immediately contact with each other, and it is possible to inhibit an increase in rigidity of the cushion member in the axial direction. Therefore, according to the above-described terminal supporting apparatus, it is possible to position the end of the outer cable in the cable axis direction and to lower the rigidity of the cushion member in the axial direction.

It should be noted that whether the clearance is formed between the cushion member and the housing or not depends on a load (such as external force) acting on the cushion member, or a housed state of the cushion member with respect to the housing (e.g. twist angle). Thus, the phrase "a clearance is formed" in the present specification does not mean that the clearance has actually been formed when the cushion member is housed by the housing, but means that a size allowing the formation of the clearance is adopted.

DESCRIPTION OF EMBODIMENTS

Figure 1:
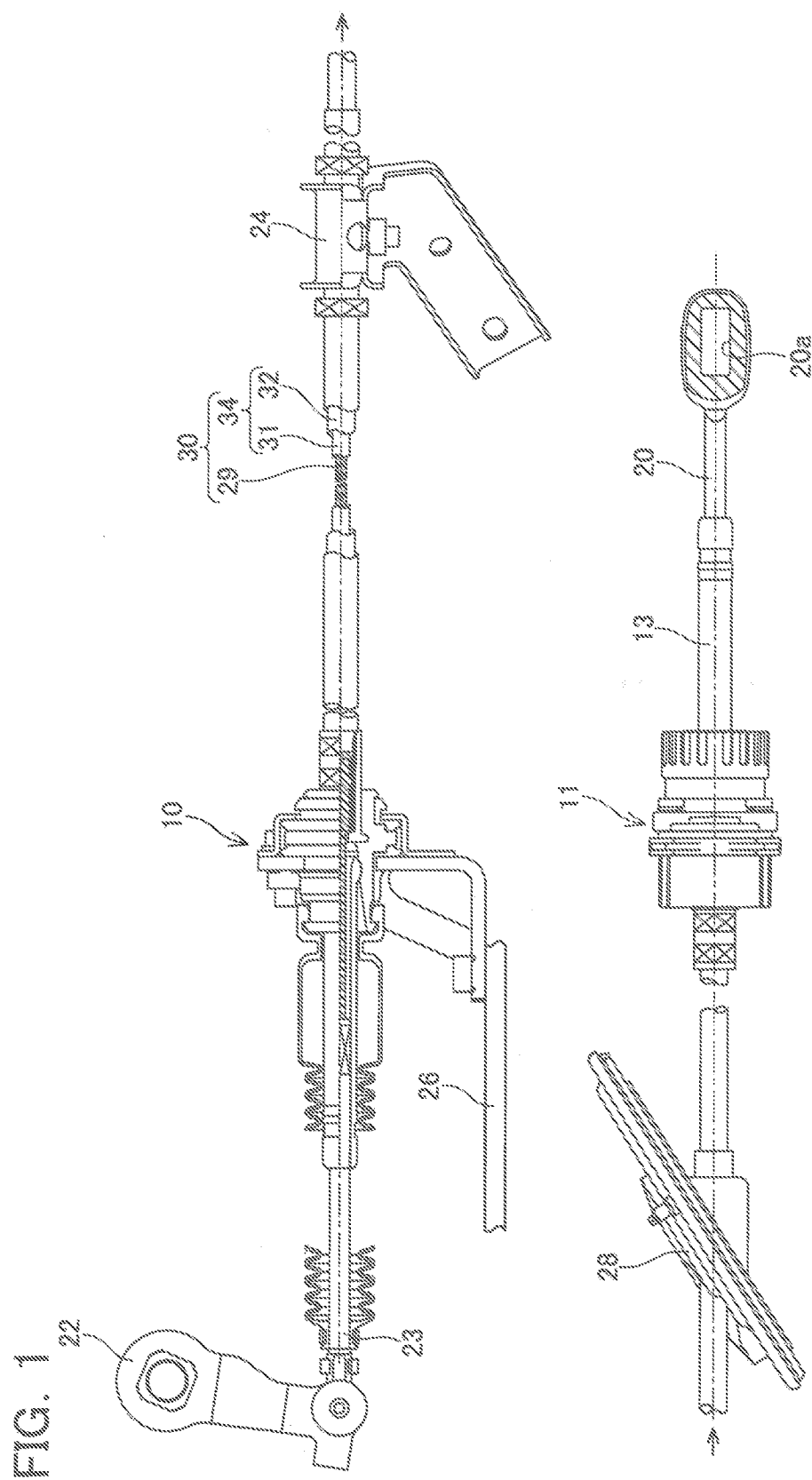
FIG. 1 is a view for schematically showing a whole structure of an AT cable utilizing a terminal supporting apparatus according to a first embodiment.

In an aspect of the terminal supporting apparatus disclosed in the present specification, it may be configured to further include a collar fixed to an outer peripheral surface of a large-diameter portion. Then, it may be configured that the outer peripheral surface of the large-diameter portion is fixed to an inner surface of a housing by fixing the collar to the inner surface of the housing. According to such a configuration, it is possible to easily fix the outer peripheral surface of the large-diameter portion and the inner peripheral surface of the housing.

In the above-described terminal supporting apparatus, the cushion member may include a first small-diameter portion that is provided at one end side of the large diameter portion in the axial direction and has a smaller diameter than the large-diameter portion, and a second small-diameter portion that is provided at the other end side of the large-diameter portion in the axial direction and has a smaller diameter than the large-diameter portion. Then, a clearance may be formed between an outer peripheral surface of at least in a part of the first small-diameter portion or the second small-diameter portion and the inner surface of the housing. According to such a configuration, it is possible to reduce friction generated between the cushion member and the housing when the hub is displaced in the cable axis direction.

Here, the clearance may be formed over an entire region of the outer peripheral surface of each of the first small-diameter portion and the second small-diameter portion with respect to the inner surface of the housing at least within each range in which they make contact with a hub. According to such a configuration, since the first small-diameter portion and the second-small diameter portion do not contact with the inner surface of the housing, it is possible to reduce friction generated between the cushion member and the housing.

Additionally, in another aspect of the terminal supporting apparatus disclosed in the present specification, a projecting portion projecting in a radial direction may be formed on the outer peripheral surface of the large-diameter portion. Further, the projecting portion of the large-diameter portion may be fixed to the inner surface of the housing. According to such a configuration, it is possible with a simple structure to fix the outer peripheral surface of the large-diameter portion to the inner surface of the housing by forming the projecting portion on the outer peripheral surface of the large-diameter portion.

In the above-described terminal supporting apparatus, an axial length of the large-diameter portion may be longer than that of the projecting portion. In this case, it may be configured that the outer peripheral surface and an end surface in the axial direction of the projecting portion are fixed to the inner surface of the housing. According to such a configuration, since the clearance is formed between a part of the outer peripheral surface of the large-diameter portion and the inner peripheral surface of the housing, it is further possible to decrease the rigidity of the cushion member in the axial direction.

Alternatively, the axial length of the projecting portion may be longer than that of the large-diameter portion. Further, at least the end surface in the axial direction of the projecting portion may be fixed to the inner surface of the housing. It is possible to easily form the clearance between the end surface of the large-diameter portion in the axial direction and the inner surface of the housing, by adopting the projecting portion whose axial length is longer than that of the large-diameter portion.

When the axial length of the projecting portion is longer than that of the large-diameter portion, the cushion member may be formed so that the clearance between the outer peripheral surface of the projecting portion and the inner peripheral surface of the housing is formed in a state before the cushion member is housed by the housing. Furthermore, it may be configured that the clearance is formed between the outer peripheral surface of the projecting portion and the inner peripheral surface of the housing in a state where the cushion member is housed in the housing. According to such a configuration, when the cushion member is housed in the housing, it is possible to make a force, by which the inner peripheral surface of the housing presses the outer peripheral surface of the projecting portion, smaller or 0 so as to improve the decrease of the rigidity of the cushion member in the axial direction.

It should be noted that, even if the axial length of the projecting portion is longer than that of the large-diameter portion, the cushion member may further include a first small-diameter portion that is provided at one end side of the large-diameter portion in the axial direction and has a smaller diameter than the large-diameter portion, and a second small-diameter portion that is provided at the other end side of the large-diameter portion in the axial direction and has a smaller diameter than the large-diameter portion. Further, it may be configured that the clearance is formed between the outer peripheral surface of at least a part of the first small-diameter portion or the second small-diameter portion and the inner surface of the housing.

In the case that the first small-diameter portion and the second-small diameter portion are formed on the cushion member, a projection portion projecting in a radial direction may be formed on each of the outer peripheral surfaces of the first small-diameter portion and the second small-diameter portion at least within a range that they make contact with the hub. According to such a configuration, when the end of the outer cable is inclined in the housing, since the projection portions of the first small-diameter portion and the second small-diameter portion abut on the inner surface of the housing, it is possible to inhibit the inclination of the outer cable.

It should be noted that the hub and the cushion member can be formed integrally in the terminal supporting apparatus described above. Thus, it may be configured that the clearance is not formed between the hub and the cushion member. By forming the hub and the cushion member integrally, it is possible to easily construct the terminal supporting apparatus.

Exemplary Embodiments

A terminal supporting apparatus 11 according to a first embodiment will be described. The terminal supporting apparatus 11 supports an end of an automatic transmission cable (hereinafter, referred as an AT cable) that is arranged between a shift lever and an automatic transmission (hereinafter, referred as a transmission) in a car. As shown in FIG. 1, the AT cable 30 includes an inner cable 29 and an outer cable 34. The outer cable 34 includes a resin liner 31 and a cover portion 32 that covers an outer periphery of the resin liner 31. The cover portion 32 is configured with strand wires and a resin coating. The inner cable 29 is inserted into the outer cable 34 and is movable forward and backward inside the outer cable 34. An input rod 20 is connected to one end of the inner cable 29, and an output rod 23 is connected to the other end of the inner cable 29.

A hole portion 20a is formed at a tip of the input rod 20. A shift lever (not shown in figures) is connected to the hole portion 20a. A tip of an output rod 23 is connected to a transmission (not shown in figures) provided in an engine room via a link member 22. An operation (displacement) input to the shift lever by a driver is transmitted to the inner cable 29 via the input rod 20. The displacement transmitted to the inner cable 29 is transmitted to the transmission via the output rod 23 and the link member 22.

The end of the outer cable 34 at the input rod 20 side is supported by a terminal supporting apparatus 11. The terminal supporting apparatus 11 is fixed to a housing of a shift lever apparatus. The end of the outer cable 34 at the output rod 23 side is supported by the terminal supporting apparatus 10. The terminal supporting apparatus 10 is fixed to a cable fixation member 26 in the engine room. An intermediate part of the outer cable 34 is clamped to a predetermined point of the car body by a stopper 24 and a retainer 28. It should be noted that the terminal supporting apparatus 10 is similarly configured to a conventional terminal supporting apparatus, and that the following description explains about the terminal supporting apparatus 11.

Figure 2:
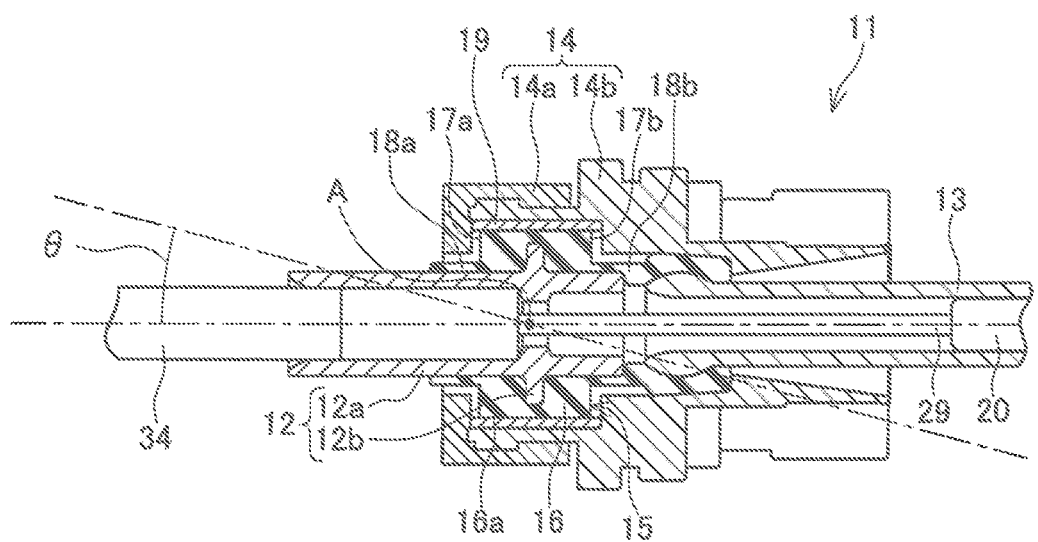
FIG. 2 is a cross section of the terminal supporting apparatus according to the first embodiment cut by a surface passing a cable axis.

A configuration of the terminal supporting apparatus 11 will be described in reference to FIG. 2. The terminal supporting apparatus 11 is configured with a hub 12, a guide pipe 13, a cushion 15 (an example of the cushion member), and a housing 14.

The housing 14 includes a cover 14b and a cap 14a. The cover 14b is formed of resin. A part of the hub 12, the cushion 15, and a part of the guide pipe 13 are housed inside the cover 14b. A part of the hub 12 projects from one end (left end in FIG. 2) of the cover 14b. A part of the guide pipe 13 projects from the other end (right end in FIG. 2) of the cover 14b. The cushion 15 is positioned within the cover 14b. The cover 14b is fixed to the housing of the shift lever apparatus.

The cap 14a is formed of resin and attached to one end (left end in FIG. 2) of the cover 14b. For example, a screw mechanism can be utilized for attaching the cap 14a to the cover 14b. In other words, it is possible to attach the cap 14a to the cover 14b, by engaging the female screw formed on an inner peripheral surface of the cap 14a and the male screw formed on outer peripheral surface of the cover 14b. When the cap 14a is attached to the cover 14b, one end of the cover 14b is closed by the cap 14a and the cushion 15 is housed in a space surrounded by the cap 14a and the cover 14b.

The hub 12 is formed in a cylindrical shape and includes a cylindrical portion 12a and a flange portion 12b. The outer cable 34 is fixed to one end of the cylindrical portion 12a (left side more than the flange portion 12b in FIG. 2). The other end of the cylindrical portion 12a (right side more than the flange portion 12b in FIG. 2) is coupled to the guide pipe 13 via the cushion 15, through which the inner cable 29 passes. The flange portion 12b is formed on an outer periphery of the cylindrical portion 12a so as to be in a ring shape circulating around the outer periphery of the cylindrical portion 12a.

The guide pipe 13 is formed in a cylindrical shape, into which the inner cable 29 and the input rod 20 are inserted. The input rod 20 is guided by the guide pipe 13. A proximal end (left end in FIG. 2) of the guide pipe 13 is swingably attached to the cover 14b via the cushion 15. Thus, in response to the operation of the shift lever, the input rod 20 can swing with respect to the cover 14b.

The cushion 15 is provided on the outer periphery of the hub 12 to surround the flange portion 12b. For example, the cushion 15 may be made of rubber material, such as EPDM (ethylene-propylene-diene rubber), NR (natural rubber), or CR (chloroprene rubber) or the like. The cushion 15 includes a large-diameter portion 16 that abuts on a front surface and a back surface of the flange portion 12b, a fist small-diameter portion 18a arranged at one end side (left side in FIG. 2) of the large-diameter portion 16, and a second small-diameter portion 18b arranged at the other end side (right side in FIG. 2) of the large-diameter portion 16. A diameter of the first small-diameter portion 18a and a diameter of the second small-diameter portion 18b are configured to be smaller than that of the large-diameter portion 16. The large diameter portion 16, the first small-diameter portion 18a and the second small-diameter portion 18b are integrally formed.

An outer peripheral surface 16a of the large-diameter portion 16 is fixed to a collar 19. For example, vulcanizing adhesion can be utilized for fixing the large-diameter portion 16 and the collar 19. The collar 19 is fixed to an inner peripheral surface of the cover 14b by press fitting or the like. Thus, the outer peripheral surface 16a of the large-diameter portion 16 is fixed to the inner surface of the housing 14 via the collar 19. A position of the cushion 15 in a cable axis direction with respect to the cover 14b is determined by fixing the collar 19 to the inner peripheral surface of the cover 14b. As a result, a position of the hub 12 in the cable axis direction and a position of the outer cable 34 in the cable axis direction are determined.

On the other hand, both end surfaces 17a, 17b (end surfaces in the cable axis direction) of the large-diameter portion 16 do not abut on the inner surface of the housing 14. Thus, clearances are formed between them. Particularly, a clearance is formed between one end surface 17a (left end surface in FIG. 2) of the large-diameter portion 16 and the inner surface of the cap 14a, and between the other end surface 17b (right end surface in FIG. 2) of the large-diameter portion 16 and the inner surface of the cover 14b. In other words, thickness of the large-diameter portion 16 in the cable axis direction is configured to be shorter than a length of an inner space in the cable axis direction which is formed by the housing 14 and houses the large-diameter portion 16.

The inner peripheral surface of the first small-diameter portion 18a abuts on the hub 12 at one end side (left end in FIG. 2) of the large-diameter portion 16. The outer peripheral surface of the first small-diameter portion 18a is formed to be flat, and the clearance is formed between the outer peripheral surface and the cap 14a. The tip of the first small-diameter portion 18a is located on an outer side of the housing 14.

The second small-diameter portion 18b extends in the cover 14b from the large-diameter portion 16 to the guide pipe 13 and is coupled to the proximal end of the guide pipe 13. One end side of the inner peripheral surface of the second small-diameter portion 18b abuts on the hub 12 and the other end side abuts on the guide pipe 13. The outer peripheral surface of the second small-diameter portion 18b abuts on the inner surface of the cover 14b at a part where it is coupled to the guide pipe 13, and forms the clearance between the second small-diameter portion 18b and the inner surface of the cover 14b at the other parts (including an area abutting on the hub). The tip of the second small-diameter portion 18b is located in the housing 14 (cover 14b).

It should be noted that whether the clearance is formed between the cushion 15 and the inner surface of the housing 14 or not depends on a load acting on the cushion 15, or a housed state of the cushion 15 within the housing 14 (for example, a twisting angle or the like). Thus, the above phrase "the clearance is formed" does not mean that the clearance is always formed between the cushion 15 and the inner surface of the housing 14. In other words, it means that a size of the cushion 15 in a state where the cushion 15 is not housed by the housing 14 is designed to form the above-described clearance between the cushion 15 and the housing 14.

In addition, the cushion 15, the hub 12 and the collar 19 can be formed integrally by insert molding. In order to integrally form the cushion 15, the hub 12 and the collar 19, the cushion 15 may be vulcanization-adhered with the hub 12 and the cushion 15 may be vulcanization-adhered with the collar 19. Thus, it is possible to inhibit the formation of the clearance between the cushion 15 and the hub 12, and between the cushion 15 and the collar 19. In addition, it is possible to easily construct the terminal supporting apparatus 11 by integrally forming the hub 12, the cushion 15, and the collar 19.

As described above, in the terminal supporting apparatus 11 of the present example, the outer peripheral surface of the cushion 15 (particularly, the outer peripheral surface of the large-diameter portion 16) is fixed to the housing 14 via the collar 19. Therefore, even if the clearance is formed between the end surface (particularly, both end surfaces of the large-diameter portion 16) of the cushion 15 in the cable axis direction and the housing 14, it is possible to position the hub 12 and the outer cable 34 in the cable axis direction.

In addition, since the clearance is formed between the end surface of the cushion 15 in the cable axis direction and the housing 14, the force in the cable axis direction is received by utilizing shear property of the cushion 15. As a result, it is possible to lower the rigidity of the cushion 15 in the cable axis direction and to drastically enhance vibration inhibiting effect.

Furthermore, it is possible to reduce the size of cushion 15 (particularly, the large-diameter portion 16) in the cable axis direction, because the clearance is formed between the end surfaces 17a, 17b of the cushion 15 in the cable direction and the housing 14. If the size of the cushion 15 in the cable axis direction is shorter, it is possible to increase the rigidity of the cushion 15 in the cable axis direction when the operation load is applied to the AT cable 30 and the clearance between the cushion 15 and the housing 14 is disappeared (in other words, when the end surface 17a or the end surface 17b of the cushion 15 contacts with the housing 14). As a result, it is possible to reduce the stroke loss caused when operating the AT cable 30.

In addition, the clearance is also formed between outer peripheral surfaces of the small-diameter portions 18a, 18b of the cushion 15 and the inner surface of the housing 14. Therefore, even if the axis of the hub 12 (the outer cable 34) is inclined to the axis of the housing 14 (the twisting force is generated), it is possible to inhibit the small-diameter portions 18a, 18b of the cushion 15 from contacting with the inner surface of the housing 14. As a result, it is possible to inhibit the increase of the rigidity of the cushion 15 in the cable axis direction, and to lead the favorable vibration inhibiting effect. Furthermore, since the slide of the cushion 15 and the housing 14 is inhibited, a hysteresis loss of the AT cable 30 can be reduced.

Now, the following will be described about the measurement results of the rigidity and the vibration property in the cable axis direction of the terminal supporting apparatus 11, in which the terminal supporting apparatus 11 according to the first embodiment was actually manufactured and the hub 12 was attached to the housing 14 with changing the angle (so called, twisting angle 0) formed by the axis of the hub 12 and the axis of the housing 14. For the rigidity in the cable axis direction, diagonal spring constant (N/mm), tension spring constant (N/mm), compression spring constant (N/mm) and hysteresis loss load (N) were measured. In addition, for the vibration property, the outer cable 34 was excited by an excitation machine to measure amplitude (dB) of the hub 12 and amplitude (dB) of the housing 14, and the reduction amount was estimated as the vibration inhibiting effect (dB). It should be noted that, in the terminal supporting apparatus of a comparative example, the outer peripheral surface and the end surface of the cushion (the small-diameter portion and the large-diameter portion) are configured to be brought into contact with the inner surface of the housing, and the other elements are configured to be similar to the terminal supporting apparatus 11.

|  | Twisting Angle | Diagonal Spring Constant | Tension Spring Constant | Compression Spring Constant | Average Spring Constant | Hysteresis Loss Load |
| --- | --- | --- | --- | --- | --- | --- |
| Embodiment | 0° | 332.8 | 275.9 | 282.1 | 279.0 | 6.5 |
|  | 2° | 315.1 | 266.1 | 265.0 | 265.6 | 6.3 |
|  | 4° | 318.5 | 269.5 | 273.4 | 271.4 | 5.9 |
|  | 6° | 371.5 | 315.1 | 301.5 | 308.3 | 6.8 |
| Comparative Example | 0° | 1051.1 | 758.0 | 814.0 | 786.0 | 10.1 |
|  | 2° | 1018.4 | 722.0 | 793.0 | 757.5 | 10.2 |
|  | 4° | 1058.5 | 827.0 | 841.0 | 834.0 | 8.5 |
|  | 6° | 1088.1 | 826.0 | 874.0 | 850.0 | 8.6 |

Figure 3:
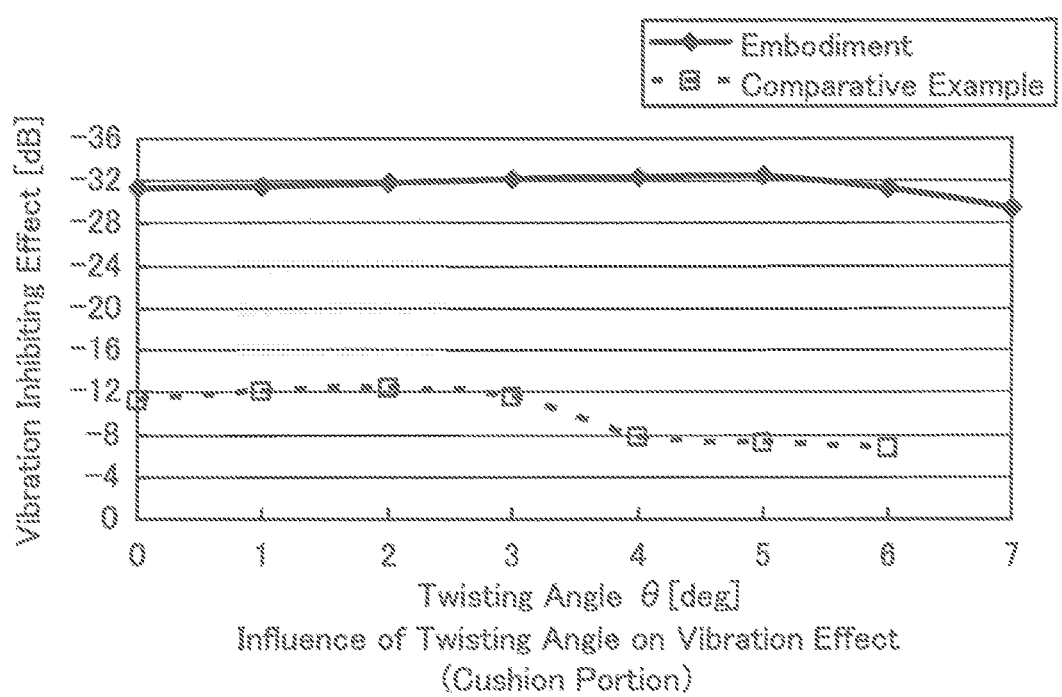
FIG. 3 is a graph showing measured results for a vibration inhibiting effect.

As shown in the table 1, the rigidity of the cushion of the embodiment in the axial direction was remarkably smaller with each twisting angle than the rigidity of the comparative example. In addition, as apparently shown in FIG. 3, the present embodiment could obtain better vibration inhibiting effect with each of all the twisting angles than the comparative example. It should be noted that FIG. 3 shows that the more the negative values of the vibration inhibiting effect represented by the vertical axis is increased, the more the vibration transmitted from the hub 12 to the housing 14 is reduced and the higher vibration inhibiting effect is obtained.

The first embodiment of the terminal supporting apparatus will be described above in detail. However, the explanation is described merely for the illustrative purpose and is not restrictive to the scope of claims. Various changes or modifications from the embodiments described above are embraced by the technique recited in the scope of claims.

Figure 4:
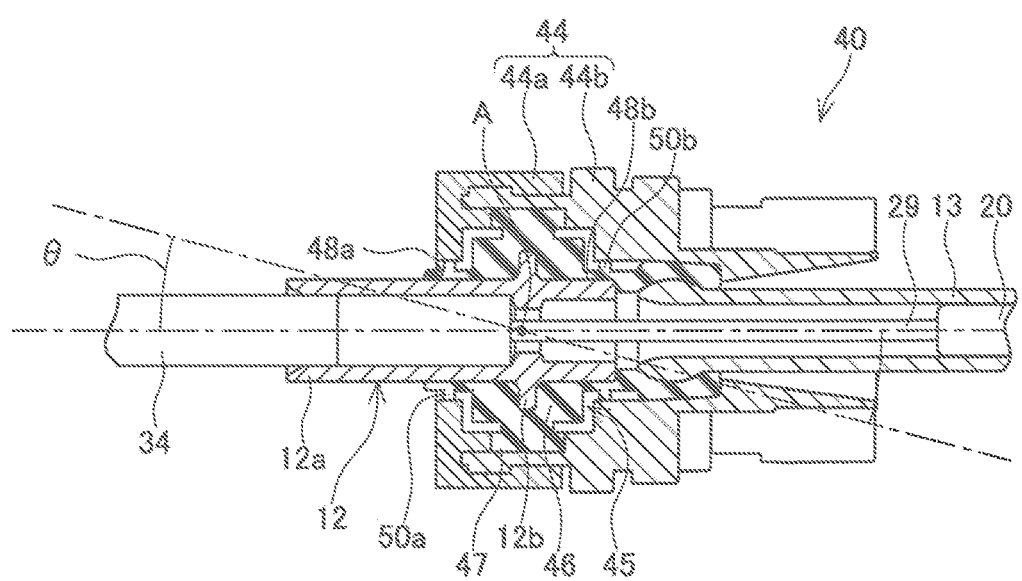
FIG. 4 is a cross section of the terminal supporting apparatus according to a second embodiment cut by the surface passing the cable axis.

For example, it is possible to utilize the terminal supporting apparatus 40 as shown in FIG. 4. The terminal supporting apparatus 40 of the second embodiment is different from the terminal supporting apparatus 11 of the first embodiment, in the method for fixing cushion 45 to the housing 44, and in the formation of projection portions 50a, 50b at the small-diameter portions 48a, 48b of the cushion 45. The other configurations are similar to those of the terminal supporting apparatus 11 of the first embodiment described above. Thus, the corresponding portions to those of the terminal supporting apparatus 11 of the first embodiment are provided with the same reference numbers as those of the first embodiment, and explanations of the corresponding portions are omitted.

As shown in FIG. 4, a projecting portion 47 is formed on an outer peripheral surface of a large-diameter portion 46 of a cushion 45 in a terminal supporting apparatus 40. The projecting portion 47 is projecting from the outer peripheral surface of the large-diameter portion 46 in a radial direction, and a tip of the projecting portion 47 is swelling out in a cable axis direction. As apparently shown in figures, an axial length of the projecting portion 47 is shorter than that of the large-diameter portion 46. Thus, a part of the outer peripheral surface of the large-diameter portion 46 (a part other than the projecting portion 47) opposes an inner surface of a housing 44, and a clearance is formed between them. The swelling portion at the tip of the projecting portion 47 is positioned between a cover 44b and a cap 44a, and is held between the cover 44b and the cap 44a. A position of the cushion 45 is determined in the housing by clamping the tip of the projecting portion 47 with the cover 44b and the cap 44a. In a state where the swelling portion located at the tip of the projecting portion 47 is clamped by the cover 44b and the cap 44a, the swelling portion of the projecting portion 47 is deformed outwardly and the outer peripheral surface of the swelling portion is pressed by the inner peripheral surface of the cover 44b. Thus, the projecting portion 47 is stably held in the housing 44. It should be noted that, similar to the first embodiment, a clearance is formed between the end surface of the large-diameter portion 46 in the axial direction and the inner surface of the housing 44.

Also in the terminal supporting apparatus 40 shown in FIG. 4, the outer peripheral surface of the cushion 45 is fixed to the housing 44, and the clearance is formed between the end surface of the cushion 45 (the large-diameter portion 46) in the cable axis direction and the housing 44. Thus, it is possible to decrease rigidity of the cushion 45 in the cable axis direction, and drastically enhance vibration inhibiting effect. In addition, since the cushion 45 is fixed to the housing 44 by clamping the projection portion 47 of the cushion 45 with the housing 44, it is possible to eliminate a member (the collar 19 in the first embodiment) utilized for fixing the cushion 45 to the housing 44.

In addition, projection portions 50a, 50b projecting in the radial direction are formed on outer peripheral surfaces of the small-diameter portions 48a, 48b of the cushion 45. The projection portions 50a, 50b are formed in ring shapes circulating around an outer periphery of the cushion 45. The projection portions 50a, 50b are arranged at symmetric positions with respect to a flange portion 12b of a hub 12. As apparently shown in FIG. 4, the position of the projecting portion 47 of the cushion 45 is the same as the position of the flange portion 12b in the cable axis direction. In other words, the outer peripheral surface of the cushion 45 is fixed to the housing 44 at the position of the flange portion 12b. Thus, the hub 12 and the outer cable 34 are inclined (i.e., twisted) with respect to the housing 44 about the point A in FIG. 4. Then, the projection portions 50a, 50b are formed symmetrically with respect to the point A on the small-diameter portions 48a, 48b of the cushion 45. Thus, even if the hub 12 and the outer cable 34 are inclined, the projection portions 50a, 50b abut on the inner surface of the housing 44, and it is possible to inhibit the further inclination of the hub 12 and the outer cable 34. It should be noted that, even if the projection portions 50a, 50b of the cushion 45 abut on the inner surface of the housing 44, the contact area of the projection portions 50a, 50b with the housing 44 is small. Thus, friction is small. Therefore, even if the projection portions 50a, 50b are formed, other properties are not drastically deteriorated. In addition, in the first embodiment, although the projecting portions are not formed on the small-diameter portions 18a, 18b of the cushion 15, the projecting portions can be formed on the small-diameter portions 18a, 18b of the cushion 15 even in the first embodiment, similar to the second embodiment.

Figure 5:
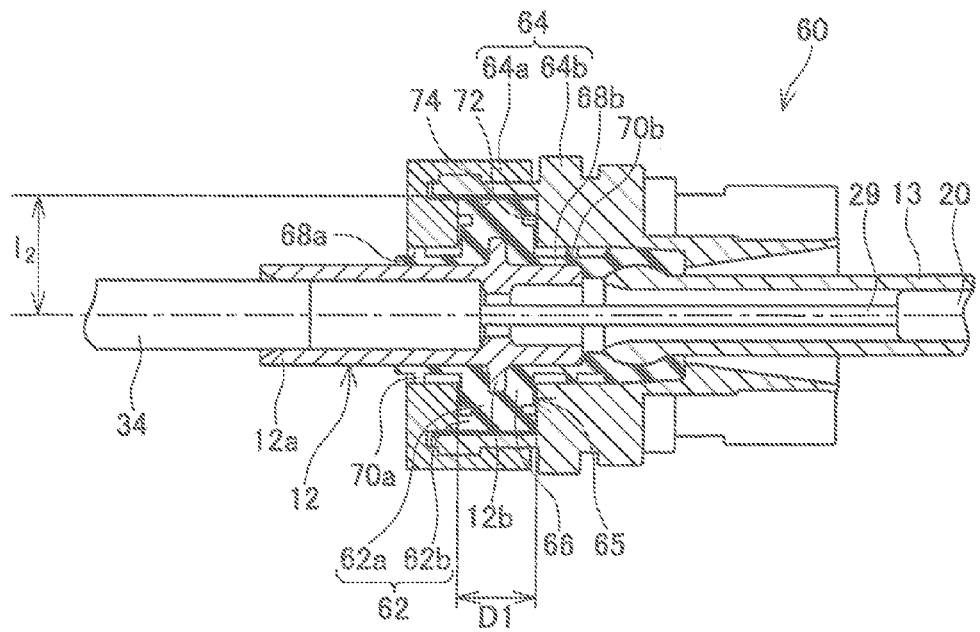
FIG. 5 is a cross section of the terminal supporting apparatus according to a third embodiment cut by the surface passing the cable axis.
Figure 6:
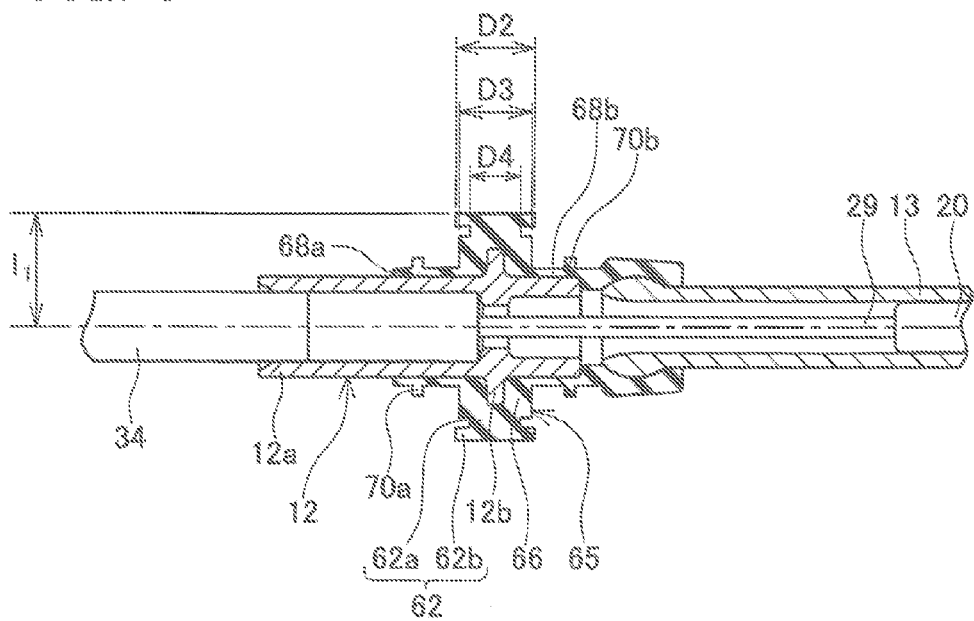
FIG. 6 is a cross section of an end of the control cable before housed by the housing in the terminal supporting apparatus according to the third embodiment.

Furthermore, it is possible to utilize a terminal supporting apparatus 60 as shown in FIGS. 5 and 6. Compared to the terminal supporting apparatus 40 in the second embodiment, the terminal supporting apparatus 60 of a third embodiment is different from the terminal supporting apparatus 40 of the second embodiment, in a shape of a projecting portion 62 (example of the projecting portion) of a cushion 65 and in shapes of a cover 64b and a cap 64a. The other configurations are similar to those of the terminal supporting apparatus 40 of the second embodiment. Thus, the corresponding portions to those of the terminal supporting apparatus 40 of the second embodiment are provided with the same reference numbers as those of the second embodiment, and explanations of the same portions are omitted.

As shown in FIG. 6, also in the terminal supporting device 60, the projection 62 is formed on an outer peripheral surface of a large-diameter portion 66 of the cushion 65. The projecting portion 62 is projecting from the outer peripheral surface of the large-diameter portion 66 in a radial direction. The projecting portion 62 includes a proximal end 62a provided at the side of the hub 12 and a swelling portion 62b provided at an outer periphery side of the proximal end 62a. The swelling portion 62b is swelling out in a cable axis direction. As apparently shown in FIG. 6, an axial length D4 of the proximal end 62a is shorter than an axial length D3 of the large-diameter portion 66. In addition, an axial length D2 of the swelling portion 62b is longer than the axial length D3 of the large-diameter portion 66. In short, a relationship D2>D3>D4 is established. Additionally, in a state before the cushion 65 is housed in a housing 64, a size of a portion from an axis of an inner cable 29 to an outer peripheral surface of the swelling portion 62b is set to $1_1$.

As shown in FIG. 5, inside the cover 64b and the cap 64a, a space is formed in an approximately cylindrical shape for housing the large-diameter portion 66 of the cushion 65. Different from the second embodiment, inner peripheral surfaces of the cover 64b and the cap 64a of this example are formed in simple shapes (i.e., planar shapes). An axial length D1 of this inner space is configured to be shorter than the axial length D2 of the swelling portion 62b, and longer than the axial length D3 of the large-diameter portion 66. In addition, a size $l_2$ of the inner space in the radial direction is configured to be longer than the above-described size $l_1$. Thus, when the cushion 65 is housed in the housing 64, the both end surfaces of the swelling portion 62*b* in the axial direction abut on the inner surfaces of the cover 64*b* and the cap 64*a*, and the swelling portion 62*b* is compressed in the axial direction. Therefore, the swelling portion 62*b* is clamped by the cover 64*b* and the cap 64*a*, and the outer peripheral surface of the cushion 65 is fixed on the inner surface of the housing 64. In addition, a clearance is formed between the end surface of the large-diameter portion 66 in the axial direction and the inner surface of the cover 64*b* or the cap 64*a*. Furthermore, the size (radius) $l_2$ of the inner space is configured to be longer by a predetermined length than the above-described size $l_1$. Thus, even if the swelling portion 62*b* is pressed by the cover 64*b* and the cap 64*a* and is deformed in the radial direction, a clearance is formed between the outer peripheral surface of the swelling portion 62*b* and the inner peripheral surface of the cover 64*b*. Therefore, even in the terminal supporting apparatus 60 of the third embodiment, it is possible to lower the rigidity of the cushion 65 in the axial direction by properly positioning the hub 12 and the outer cable 34 in the cable axis direction.

Although the clearance is formed between the outer peripheral surface of the swelling portion 62*b* and the inner peripheral surface of the housing 64 in the terminal supporting apparatus 60 of the third embodiment described above, it may be configured that the outer peripheral surface of the swelling portion 62*b* and the inner peripheral surface of the housing 64 are brought into contact with each other. Even in this configuration, it is preferred that the size $l_1$ of the cushion 65 (the size in a condition where no external force is acting) is shorter than the size $l_2$ of the inner space of the housing 64. In other words, it is preferred to adopt size, with which the clearance can be formed between the outer peripheral surface of the swelling portion 62*b* and the inner peripheral surface of the housing 64 before the cushion 65 is housed by the housing 64. In such a configuration, when the cushion 65 is housed in the housing 64, large force is not generated between the outer peripheral surface of the swelling portion 62*b* and the inner peripheral surface of the cover 64*b*. Therefore, it is possible to effectively lower the rigidity of the cushion 65 in the axial direction. In addition, a condition may be adopted where the outer peripheral surface of the swelling portion 62*b* and the inner peripheral surface of the cover 64*b* merely touch to each other (a condition where generated force between them is 0).

Further, although the projection portion is formed on the outer peripheral surface of the small-diameter portion of the cushion in the second and third embodiments described above, it may be configured that the projection portion is formed on the inner peripheral surface of the housing. Even in such a configuration, it is possible to inhibit the hub and the outer cable from being inclined.

Figure 7:
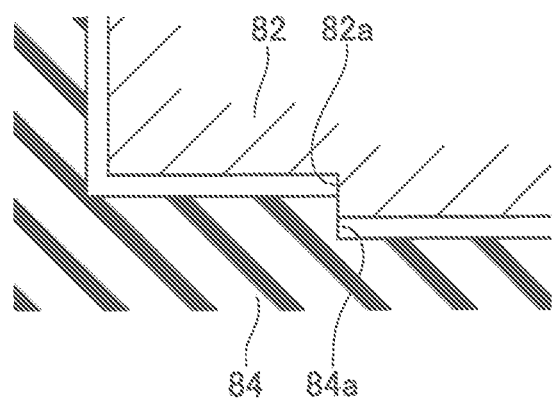
FIG. 7 is a view for enlarging and showing a part where the cushion and the housing abut on in the terminal supporting apparatus according to a variant example.

Furthermore, as shown in FIG. 7, it may be configured that a level difference 84*a* is formed on the small-diameter portion of the cushion 84, and that a level difference 82*a* abutting on the level difference 84*a* is formed on the inner surface of the housing 82. Then, it may be configured that the displacements of hub and the outer cable in the axial direction are regulated by the abutter of the level difference 84*a* on the small-diameter portion of the cushion 84 and the level difference 82*a* on the inner surface of the housing 82.

Figure 8:
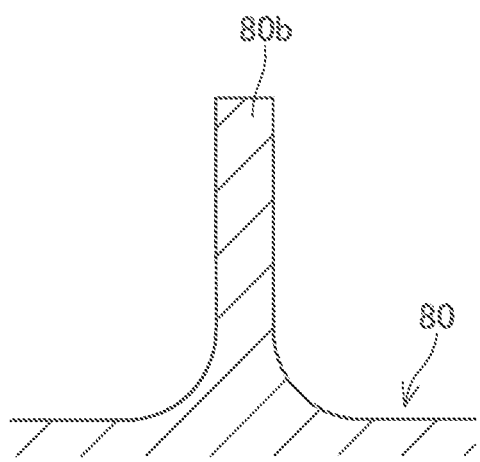
FIG. 8 is a view for enlarging and showing a flange portion of the hub in the terminal supporting apparatus according to the variant example.

Moreover, as shown in FIG. 8, it may be configured that the thickness of the flange portion 80*b* of the hub 80 is formed to be increased toward the inner periphery side from the outer periphery side. According to such a configuration, it is possible to provide a property of a two-stage spring to the cushion.

The technical elements explained in the present specification and drawings can show the technical advantage with a single or with several combinations and are not restricted by the combinations recited in the claims at the filing date. In addition, the techniques illustrated in the present specification and drawings can reach some goals at the same time, and reaching one goal among them is enough to have the technical usefulness.

What is claimed is:

1. A terminal supporting apparatus for a control cable, the terminal supporting apparatus supporting at least either one of ends of a control cable that has an inner cable and an outer cable into which the inner cable is inserted, and comprising:
    a hub that is attached to an end of the outer cable and is provided with a flange on an outer periphery;
    a cushion member that is provided to surround the outer periphery of the hub and abuts on the flange at both a front surface and a back surface of the flange; and
    a housing that houses the cushion member,
    wherein the cushion member includes a large-diameter portion that abuts on the flange, and a projecting portion projecting in a direction perpendicular to a cable axis from an outer peripheral surface of the large-diameter portion,
    the projecting portion of the cushion member is fixed to an inner surface of the housing,
    an axial length of the large-diameter portion is longer than an axial length of the projecting portion,
    a first clearance is formed between an end surface of the large-diameter portion and the inner surface of the housing over all of the end surface, the first clearance being perpendicular to the cable axis, and
    at least within a range contacting with the hub, a second clearance is formed between the cushion member and the inner surface of the housing, the second clearance being in a direction parallel to the cable axis.

2. The terminal supporting apparatus for a control cable according to claim 1, wherein
    an outer peripheral surface of the projecting portion and an end surface of the projecting portion in the direction parallel to the cable axis are fixed to the inner surface of the housing.

3. The terminal supporting apparatus for a control cable according to any one of claim 1, wherein
    the cushion member further comprises:
        a first small-diameter portion that is provided at one end side of the large-diameter portion in the direction parallel to the cable axis and has a smaller diameter than the large-diameter portion; and
        a second small-diameter portion that is provided at the other end side of the large-diameter portion in the direction parallel to the cable axis and has a smaller diameter than the large-diameter portion, and
        a clearance is formed between an outer peripheral surface of at least a part of the first small-diameter portion or the second small-diameter portion and the inner surface of the housing.

4. The terminal supporting apparatus for the control cable according to claim 3, wherein
    a projection portion projecting in the direction perpendicular to the cable axis is formed on each of the outer peripheral surfaces of the first small-diameter portion and the second small-diameter portion at least within a range making contact with the hub.

* * * * *